June 10, 1958  F. W. KUHAGEN  2,838,701
ELECTRIC MOTOR UNIT
Filed June 2, 1955

Inventor
Fred W. Kuhagen
By Schroeder, Hofgren, Brady & Wegner
Attorneys

United States Patent Office 2,838,701
Patented June 10, 1958

2,838,701

ELECTRIC MOTOR UNIT

Fred W. Kuhagen, Chicago, Ill., assignor, by mesne assignments, to Whirlpool Corporation, a corporation of Delaware Application June 2, 1955, Serial No. 512,774

2 Claims. (Cl. 310—83)

This invention relates to a motor construction.

One of the features of this invention is the provision of an improved motor construction comprising a casing section including side walls, a pair of spaced apart first and second baffles with the first baffle being adjacent to but spaced from one of the side walls to define a first chamber between this one wall and first baffle and a second chamber between the baffles in which at least the first baffle is lubricant impervious, a switch mounted in the first chamber, gearing in the second chamber, and a substantially lubricant impervious plate member extending between the inner edges of the baffles forming an inner side wall on the second chamber and containing an opening for a gear-engaging driving gear, the second chamber being adapted to contain a lubricant for the gearing.

Another feature of the invention is the provision of such a construction in which walls in the casing and integral therewith form a passageway communicating with the second chamber and with the exterior of the casing section through a side wall thereof for releasably receiving a beater shaft for operative engagement with the gearing.

Other features and advantages of the invention will be apparent from the following description of one embodiment thereof as shown in the accompanying drawings. Of the drawings.

Figure 1:
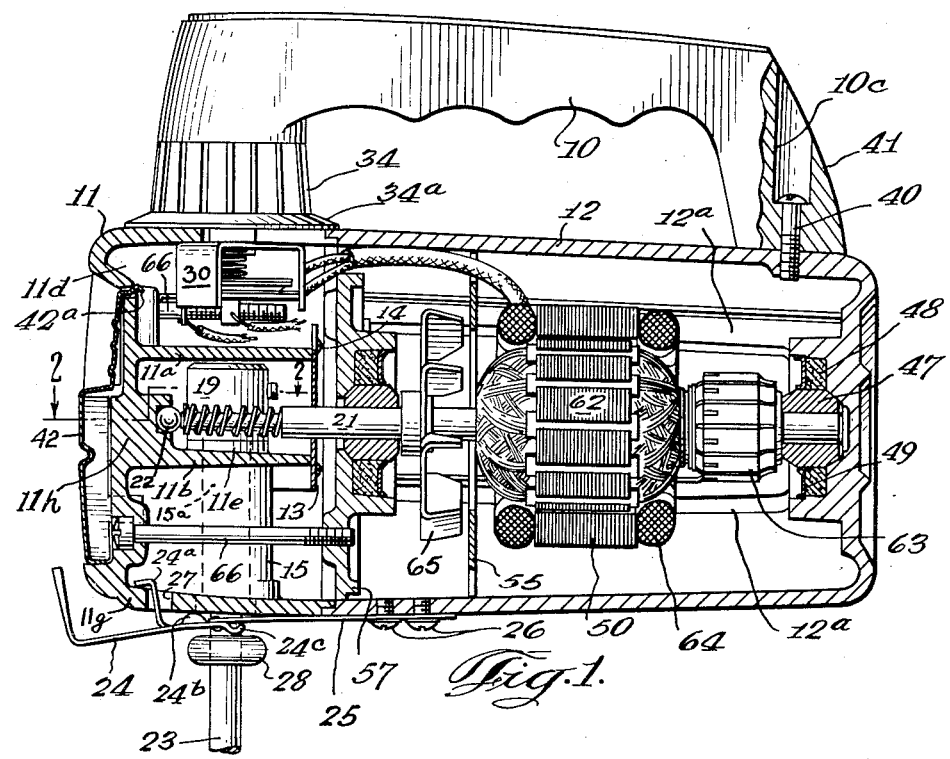
Figure 1 is a longitudinal, vertical sectional view substantially through the center of a portable food mixer embodying the invention.

The invention as illustrated in the accompanying drawings is embodied in a portable food mixer adapted to be held during the mixing operation and moved from place to place by means of a handle 10.

The casing of the mixer is divided into a front casing portion 11, and a rear or second casing portion 12. The front casing portion 11 is provided with a pair of spaced apart, substantially parallel baffles 11a and 11b with the upper baffle 11a being spaced from a side wall, here the top of the casing 11 to provide a first chamber 11d. The two baffles 11a and 11b define a second chamber 11e therebetween. At least the first baffle 11a is impervious to a lubricant.

The inner edges of the baffles 11a and 11b are substantially vertically aligned and are parallel to each other. A substantially lubricant impervious plate 13 extends between these inner edges to define an inner wall of the second chamber 11e. The plate is held in position by means of a plurality of screws 14. With this construction the chamber defined by the baffles 11a and 11b and the plate 13 is substantially lubricant impervious.

The first casing section 11 is provided with walls 15 integral with the casing and forming a pair of substantially parallel passageways 15a, each of circular cross section and each communicating with the second chamber 11e and the exterior of the casing section, through a side wall thereof, here shown as the bottom wall 11g. As shown in the drawings, the passageways 15a are substantially vertical when the mixer is held in its normal horizontal position.

A rotatable tubular member 16 is provided in each passageway 15a.

Figure 2:
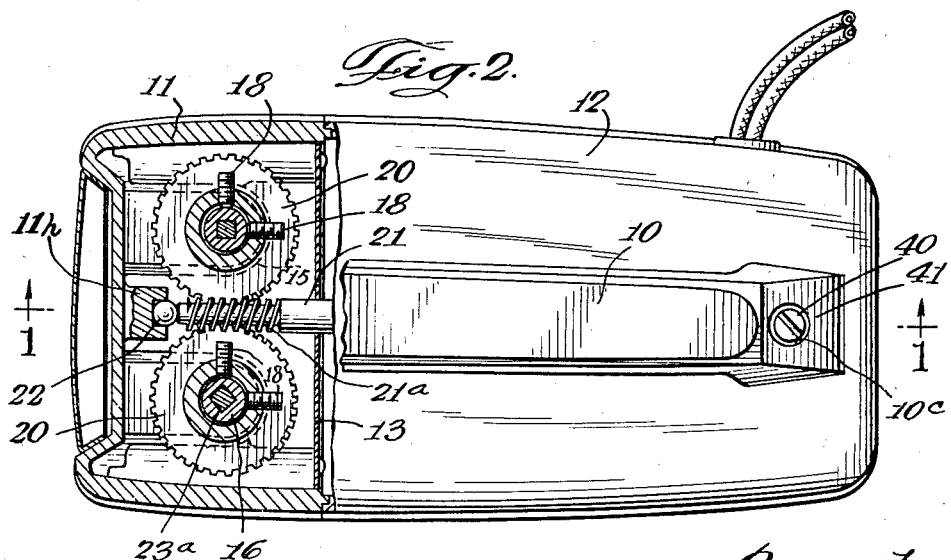
Figure 2 is a plan view partially in section of the mixer of Figure 1 with the sectional portion taken substantially along line 2—2 of Figure 1.

The upper ends of the tubular members 16 extend to points adjacent to the top baffle 11a. Fastened to the top end of each tubular member 16 within the chamber 11e by means of a pair of set screws 18 or the like, is an inverted, cup-shaped member 19. Each cup-shaped member 19, which is preferably made of nylon, has attached thereto a nylon gear 20 of generally circular shape. The gears 20 are substantially horizontally aligned and are spaced apart to provide room for contact by an intervening, intermeshing worm 21a formed in the forward end of a motor shaft 21. As can be seen in Figure 2, the worm 21a meshes with both gears 20 so that on rotation of the motor shaft 21, gears 20 and associated structures will be rotated in opposite directions.

The inner end of the motor shaft 21 bears against a thrust ball 22 held in a socket formed in a thickened portion 11h between the baffles 11a and 11b.

Each tubular member 16 is adapted to receive the shaft 23 of a beater in the customary manner. The inner end 23a of this shaft is of essentially square cross-section to engage a correspondingly shaped socket so that the beater will be rotated upon rotation of the tubular member 16.

In order to aid in removing the two beaters 23 from engagement with the mixer, a beater ejector is provided on the bottom of the mixer. This beater ejector, which is described and claimed in the co-pending application of Fred W. Kuhagen and Ansel D. Miller, Serial Number 487,382, filed February 10, 1955, now Patent No. 2,798,696, dated July 9, 1957, includes a lever 24 having one end attached to a leaf spring 25, which in turn is attached by means of screws 26 to the bottom of the mixer. Lever 24 includes an upwardly extending finger 24a extending through an opening 27 in the casing. The finger 24a serves to limit the extent of downward movement of lever 24.

In order to eject the beaters the lever is rotated in a clockwise direction as viewed in Figure 1 around an upwardly extending ridge 24b so that an opposite corresponding ridge 24c located rearwardly of the first ridge 24b will bear against collars 28 on the beater shafts 23. This forces the shafts 23 away from the mixer and disengages the inner ends of the shafts from the retaining spring 29.

The upper or first chamber 11d within the first casing section 11 contains a speed governor switch 30 of conventional construction.

A speed control knob 34 of customary construction forms a continuation of the handle 10 and is readily accessible for manipulation by the fingers of a hand grasping the handle 10. The knob 34 is provided with a bottom skirt portion 34a that rests against the upper surface of the mixer casing.

The rear of the handle 10 is held in place by means of a screw 40 extending between the bottom of a well 10c located in the rear leg 41 of the handle into the rear portion of the second casing section 12.

The front end of the front casing section 11 is provided with a decorative plate 42 held in place by means of spring fingers 42a engaging corresponding openings in the front of the casing.

The rear or second casing section 12 houses the motor proper of the mixer. This second casing portion includes a plurality of longitudinally extending internal ridges 12a spaced around the interior of the casing section. As shown there are four of these ridges.

A bearing 47 is provided for the inner end of the motor shaft 21. The bearing is lubricated in the conventional manner by means of a lubricant held in a surrounding mass 48 of felt or the like. This mass of felt is held in place by means of an annular spring closure plate 49.

The motor shaft 21 has mounted on its rear portion the usual armature 62 and commutator 63. The motor also includes the usual field coils 64 and pole pieces 50. Forwardly of the motor is a perforated baffle 55. The second casing section 12 is closed by a closure member 57.

Mounted on the shaft 21 between the transverse baffle 55 and the closure plate 57 is a fan 65 of customary construction.

In order to retain the casing sections in assembled relationship, a plurality of bolts 66 are provided extending between the front of the first casing section 11 to and engaging the transverse closure member 57. These bolts have their heads hidden by the decorative plate 42 at the front of the mixer and the rear ends of the bolts engage threaded holes in the member 57. With this construction the separate casing sections 11 and 12 may be separately assembled with their associated parts and the casing sections then assembled and fastened in place by means of the retaining bolts 66.

Having described my invention as related to the embodiment shown in the accompanying drawings, it is my intention that the invention be not limited by any of the details of description unless otherwise specified, but rather be construed broadly within its spirit and scope as set out in the accompanying plans.

I claim:

1. A motor construction, comprising: a generally cup-shaped hollow casing section including side walls; a pair of spaced apart first and second baffles with the first baffle being adjacent to but spaced from one of said side walls to define a first chamber between said one wall and first baffle and a second chamber between said baffles, at least said first baffle being substantially lubricant impervious; a switch mechanism in said first chamber; gearing in said second chamber; and a substantially lubricant impervious plate member extending between the inner edges of said baffles forming an inner side wall on said second chamber and containing an opening for a gear-engaging driving gear, the second chamber being adapted to contain a lubricant for said gearing.

2. A mixer motor construction, comprising: a generally cup-shaped hollow casing section including integral side walls; a pair of spaced apart first and second integral baffles with the first baffle being adjacent to but spaced from one of said side walls to define a first chamber between said one wall and first baffle and a second chamber between said baffles, at least said first baffle being substantially lubricant impervious; a switch mechanism in said first chamber; gearing in said second chamber; a substantially lubricant impervious plate member extending between the inner edges of said baffles forming an inner side wall on said second chamber and containing an opening for a gear-engaging driving gear, the second chamber being adapted to contain a lubricant for said gearing; and walls in said casing section integral therewith forming a passageway communicating with said second chamber and with the exterior of the casing section through a side wall thereof for rotatably receiving a beater shaft for operative engagement with said gearing.

References Cited in the file of this patent
UNITED STATES PATENTS

| | | |
|---|---|---|
| 1,922,258 | Packer | Aug. 15, 1933 |
| 1,996,476 | Krause | Apr. 2, 1935 |
| 2,037,890 | Dow | Apr. 21, 1936 |
| 2,048,096 | Bisley | July 21, 1936 |
| 2,192,845 | Bean | Mar. 5, 1940 |
| 2,292,566 | Jordan | Aug. 11, 1942 |
| 2,373,842 | Mitchell | Apr. 17, 1945 |
| 2,483,727 | Frisbie | Oct. 4, 1949 |
| 2,552,023 | Andersen | May 8, 1951 |